US009157258B2

(12) United States Patent
Lawrence et al.

(10) Patent No.: US 9,157,258 B2
(45) Date of Patent: Oct. 13, 2015

(54) VEHICLE INTERIOR LID FOR COVERING TRUNK LID UNLOCKING MECHANISM

(71) Applicant: Honda Motor Co., Ltd., Tokyo (JP)

(72) Inventors: Emily G. Lawrence, Columbus, OH (US); Toshimitsu Shimizu, Rancho Palos Verdes, CA (US); Jason Dilley, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 14/048,154

(22) Filed: Oct. 8, 2013

(65) Prior Publication Data

US 2015/0096337 A1 Apr. 9, 2015

(51) Int. Cl.
E05C 19/06 (2006.01)
E05B 83/18 (2014.01)
B60R 7/04 (2006.01)
B60R 11/00 (2006.01)
B60R 5/04 (2006.01)
B60R 13/02 (2006.01)
E05C 19/00 (2006.01)

(52) U.S. Cl.
CPC ............... *E05B 83/18* (2013.01); *B60R 5/044* (2013.01); *B60R 7/04* (2013.01); *B60R 11/00* (2013.01); *B60R 13/0268* (2013.01); *Y10S 292/11* (2013.01); *Y10S 292/63* (2013.01); *Y10T 70/5889* (2015.04)

(58) Field of Classification Search
CPC ............ B60R 2011/008; Y10S 292/11; Y10S 292/63
USPC ........................ 292/80, 81, 87, 91, 95, 96, 98; 296/37.8, 97.22
See application file for complete search history.

(56) References Cited

U.S. PATENT DOCUMENTS

| | | | | |
|---|---|---|---|---|
| 1,144,140 | A | * | 6/1915 | Kroedel et al. ............... 396/536 |
| 4,092,527 | A | * | 5/1978 | Luecke ......................... 708/140 |
| 5,050,922 | A | * | 9/1991 | Falcoff ......................... 296/37.7 |
| 5,060,990 | A | * | 10/1991 | Smith et al. ..................... 292/91 |
| 5,522,638 | A | * | 6/1996 | Falcoff et al. ................ 296/37.8 |
| 5,683,158 | A | * | 11/1997 | Lim ............................... 312/326 |
| 5,816,640 | A | | 10/1998 | Nishimura |
| 6,003,925 | A | * | 12/1999 | Litke et al. ................... 296/37.8 |
| 6,126,221 | A | * | 10/2000 | Kern ............................. 296/37.7 |
| 6,394,300 | B1 | | 5/2002 | Bosy ............................. 220/326 |
| 6,497,445 | B1 | * | 12/2002 | Combs, II ............... 296/100.07 |
| 6,761,384 | B1 | | 7/2004 | Haaf et al. |
| 7,175,217 | B1 | | 2/2007 | Lota |
| 8,283,065 | B2 | * | 10/2012 | Zhang ............................. 429/97 |
| 2009/0096221 | A1 | * | 4/2009 | Jan et al. ......................... 292/81 |
| 2012/0200108 | A1 | * | 8/2012 | Kamioka et al. ........... 296/37.12 |

FOREIGN PATENT DOCUMENTS

| | | | | |
|---|---|---|---|---|
| DE | 3735920 | | 11/1988 | |
| DE | 4305597 | | 2/1994 | |
| JP | 04362423 | A * | 12/1992 | ............ B60K 15/05 |
| JP | 09175228 | | 7/1997 | |

* cited by examiner

*Primary Examiner* — Carlos Lugo
(74) *Attorney, Agent, or Firm* — Rankin, Hill & Clark LLP

(57) ABSTRACT

A vehicle assembly for housing an unlocking mechanism provided within a vehicle passenger compartment which is operably connected to a locking device of a trunk lid includes an interior body panel having an outer surface including an opening portion for receiving an unlocking mechanism. A lid is removably mounted to the body panel and has a closed position for covering the opening portion and an opened position. The lid defines a lid body having an exterior surface. An edge portion of the exterior surface is continuous and without interruption about a periphery of the exterior surface so that the lid body exterior surface is flush with the body panel outer surface about the entire periphery of the lid body exterior surface.

16 Claims, 4 Drawing Sheets

VEHICLE INTERIOR LID FOR COVERING TRUNK LID UNLOCKING MECHANISM

BACKGROUND

It is known for a vehicle to have an electronic key that is in signal communication with a locking device of a trunk lid so that depression of a trunk lid button on the electronic key actuates the locking device. It is also known to provide a trunk lid unlocking mechanism mounted directly on an instrument panel which allows the trunk lid to be opened from in a passenger compartment of the vehicle. For this purpose, the unlocking mechanism is operably connected to the locking device of the trunk lid so that actuation of the unlocking mechanism unlocks the locking device. The unlocking mechanism can be concealed by a cover or lid, and an outer surface of the lid typically includes an interruption, such as a cut-out shape or raised feature to accommodate an operator's finger or hand space, which allows the lid to be opened. However, this type of lid design having the interruption on the outer surface can affect the aesthetic appearance of a vehicle body panel to which the key lock is mounted.

BRIEF DESCRIPTION

In accordance with one aspect, a vehicle assembly for housing an unlocking mechanism provided within a vehicle passenger compartment which is operably connected to a locking device of a trunk lid comprises an interior body panel having an outer surface including an opening portion for receiving an unlocking mechanism. A lid is removably mounted to the body panel and has a closed position for covering the opening portion and an opened position. The lid defines a lid body having an exterior surface. An edge portion of the exterior surface is continuous and without interruption about a periphery of the exterior surface so that the lid body exterior surface is flush with the body panel outer surface about the entire periphery of the lid body exterior surface.

In accordance with another aspect, a vehicle assembly for housing an unlocking mechanism provided within a vehicle passenger compartment which is operably connected to a locking device of a trunk lid comprises an interior body panel having an outer surface including an opening portion for receiving an unlocking mechanism. The opening portion includes a bottom wall offset from the outer surface. The bottom wall has an engagement hole. A lid is removably mounted to the body panel and has a closed position for covering the opening portion and an opened position. The lid defines a lid body having an exterior surface and an interior surface. An edge portion of the exterior surface extending about a periphery of the exterior surface is flush with the body panel outer surface. The lid body has an engagement member extending perpendicularly from the interior surface. The engagement member is received in the engagement hole and engages the bottom wall.

In accordance with yet another aspect, a vehicle assembly comprises an unlocking mechanism operably connected to a locking device of a trunk lid and configured to actuate the locking device to unlock the trunk lid from within a vehicle passenger compartment. An interior body panel has an outer surface including an opening portion for receiving the unlocking mechanism. The opening portion includes a bottom wall offset from the outer surface. The bottom wall has a pair of spaced engagement holes and a retaining hole. A lid is removably mounted to the body panel and has a closed position for covering the opening portion and an opened position. The lid defines a lid body having an exterior surface flush with the body panel outer surface. The lid body has a pair of engagement members received in the engagement holes and engaging the bottom wall and a retaining member movably received in the retaining hole. The lid is configured to pivot inwardly relative to the bottom wall to move from the closed position to the opened position.

DETAILED DESCRIPTION

It should, of course, be understood that the description and drawings herein are merely illustrative and that various modifications and changes can be made in the structures disclosed without departing from the present disclosure. In general, the figures of the exemplary vehicle interior lid are not to scale. It should be appreciated that the term "plurality" means "two or more", unless expressly specified otherwise. It will also be appreciated that the various identified components of the exemplary vehicle interior lid disclosed herein are merely terms of art that may vary from one manufacturer to another and should not be deemed to limit the present disclosure.

As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 1:
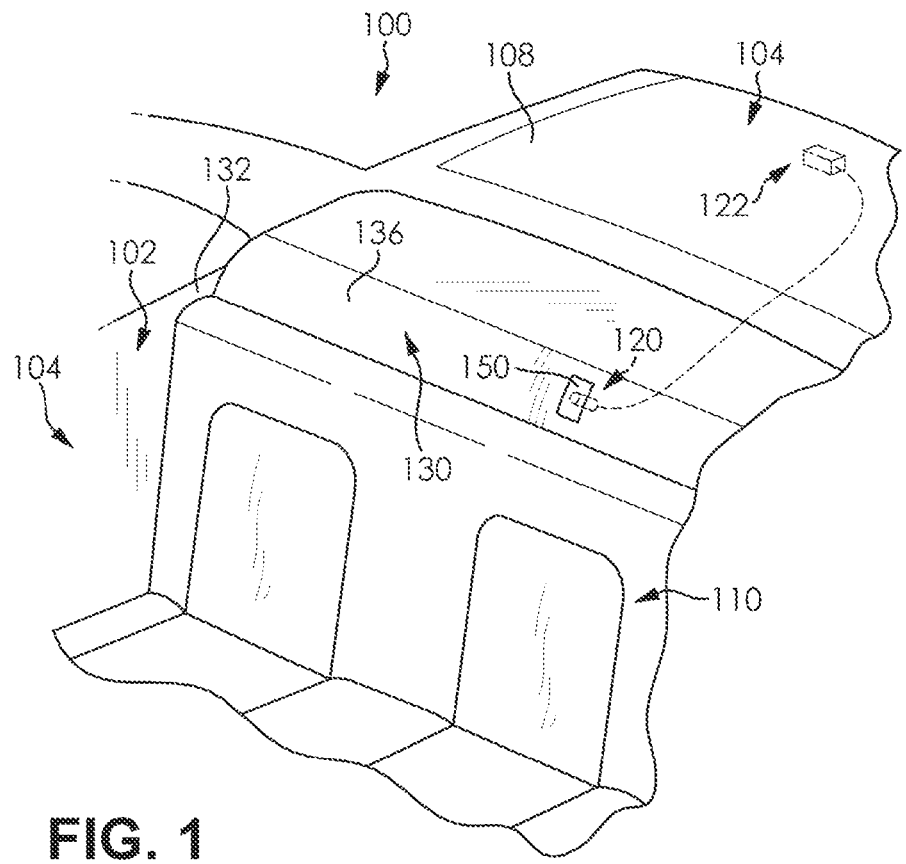
FIG. 1 is a schematic view of a vehicle assembly including an unlocking mechanism operably connected to a locking device of a trunk lid and configured to actuate the locking device to unlock the trunk lid from within a vehicle passenger compartment. The unlocking mechanism is concealed by an exemplary lid removably mounted to an exemplary interior body panel.
Figure 2:
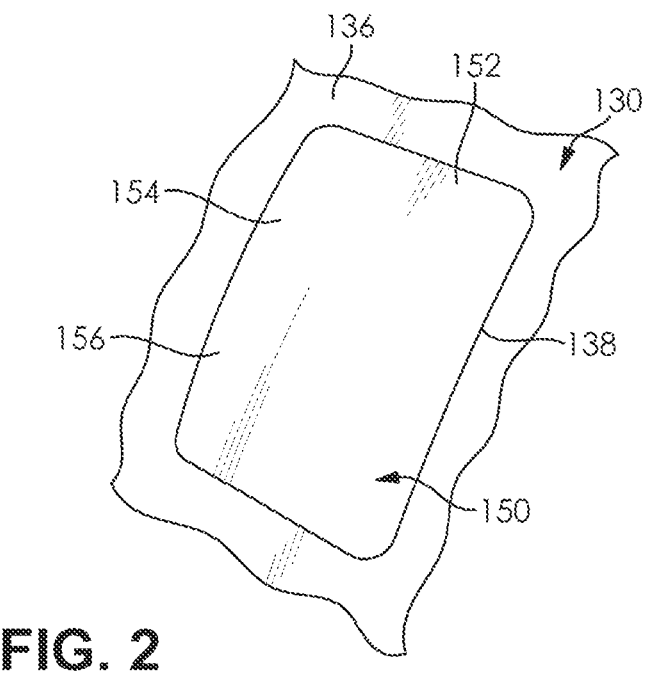
FIG. 2 is an enlarged view of the lid and interior body panel of FIG. 1 with the lid in a closed position.

Referring now to the drawings, wherein like numerals refer to like parts throughout the several views, FIGS. 1 and 2 schematically illustrate a vehicle assembly 100 including a vehicle body 102 defining a passenger compartment 104 and a storage or trunk compartment 106 covered by a trunk lid 108. A rear seat assembly 110 separates the passenger compartment 104 from the trunk compartment 106. An unlocking mechanism 120 is operably connected to a locking device 122 of the trunk lid 108 and is configured to actuate the locking device 122 to unlock the trunk lid 108 from within the vehicle passenger compartment 104. The unlocking mechanism 120 may be designed as a push-button switch that is electrically connected to the locking device 122 so that actuation of the switch unlocks the trunk lid 108. The unlocking mechanism 120 may also be designed as a key lock 124 (see FIGS. 4 and 8) mechanically connected to the locking device 122. One benefit of the key lock design of the unlocking mechanism 120 is that it allows the trunk lid 108 to be unlocked in emergency conditions when the vehicle battery is dead, which, in turn, can disable the electronic key.

Figure 4:
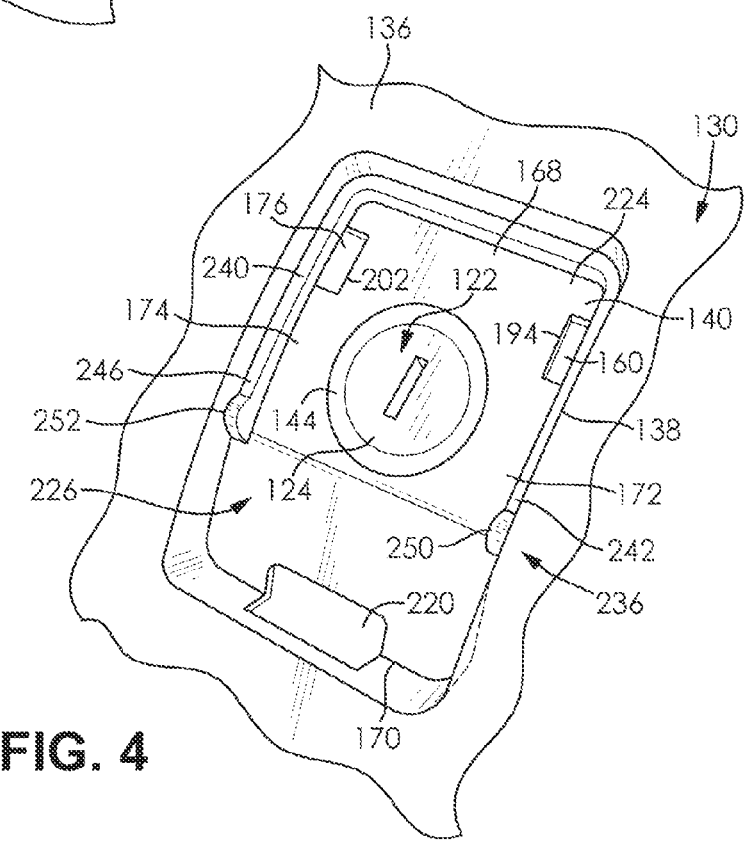
FIG. 4 is a schematic view of the interior body panel of FIG. 2 with the lid removed.

In the depicted embodiment, the unlocking mechanism 120 is mounted on part of the vehicle body 108 accessible from in the passenger compartment 104. Particularly, the unlocking mechanism is mounted on an interior body panel 130 provided rearward of the rear seat assembly 110. The interior body panel 130 spans laterally in the passenger compartment 104 between opposed side panels (only side panel 132 is shown) of the vehicle body 102 and can form part of a separating wall of the rear seat assembly 110. As shown in FIG. 4, the interior body panel 130 has an outer surface 136 including an opening portion 138 having a bottom wall 140 and a side wall 142. The bottom wall 140 is provided with an aperture 144 for receiving the unlocking mechanism 122. The unlocking mechanism 122 can be secured to the bottom wall 140 in a known manner.

A cover or lid 150 is removably mounted to the body panel 130 and has a closed position (FIG. 2) for covering the opening portion 138 and an opened position (FIG. 4) where the lid is completely removed from the body panel 130. As best depicted in FIG. 2, the exemplary lid 150 defines a lid body 152 having an exterior surface 154. An edge portion 156 of the exterior surface 154 is continuous and without interruption about a periphery of the exterior surface 154 so that the exterior surface of the lid body 152 is flush with the outer surface 136 of the body panel 130 about the entire periphery of the lid body exterior surface 154. By having the edge portion 156 of the exterior surface 154 devoid of an interruption, such as a cut-out shape or raised feature to accommodate an operator's finger or hand space, the exemplary lid 150 does not affect the aesthetic appearance of the body panel 130 to which the unlocking mechanism 122 is mounted.

Figure 3:
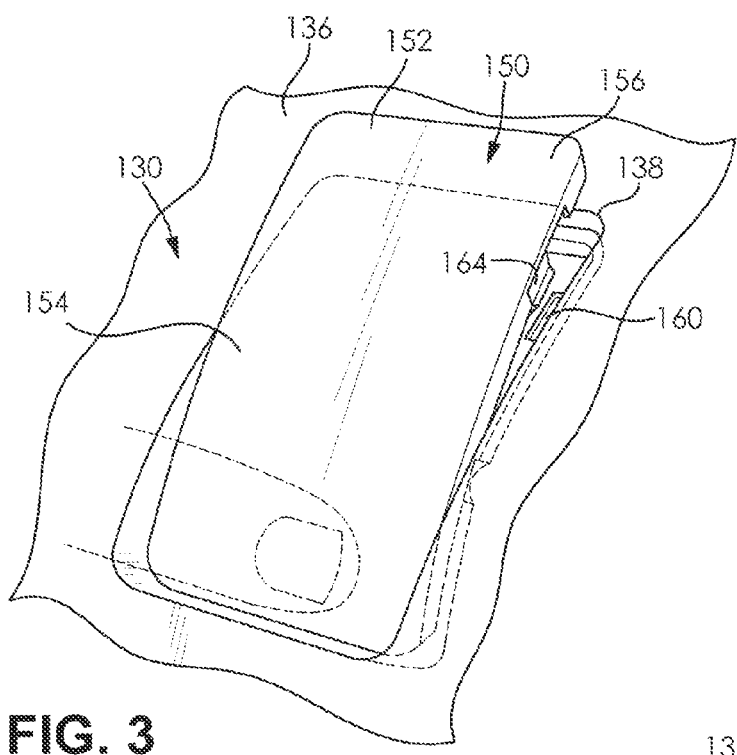
FIG. 3 is a view of the lid and interior body panel of FIG. 2 with the lid being moved from the closed position toward an opened position.

With reference to FIGS. 3 and 4, to releasably secure the lid 150 to the body panel 130, the bottom wall 140 of the opening portion 138 of the body panel 130 includes at least one engagement hole 160, and the lid body 152 includes at least one engagement member 164 which is received in the at least one engagement hole 160 extending from an interior surface 162 of the lid body 152. More particularly, the bottom wall 140 of the opening portion 138 includes opposed end portions 168, 170 and opposed side portions 172, 174 elongated relative to the end portions 168, 170. The at least one engagement hole 160 is provided on one of the side portions adjacent one of the end portions. As depicted, the at least one engagement hole 160 is a first engagement hole provided on side portion 172 adjacent end portion 168, and the bottom wall 140 includes a second engagement hole 176 provided on side portion 174 adjacent end portion 168. And the at least one engagement member 164 is a first engagement member that is received in the first engagement hole 160, and as depicted in FIG. 5 the interior surface 162 of the lid body 152 further includes a second engagement member 180 which is received in the second engagement hole 176.

Figure 5:
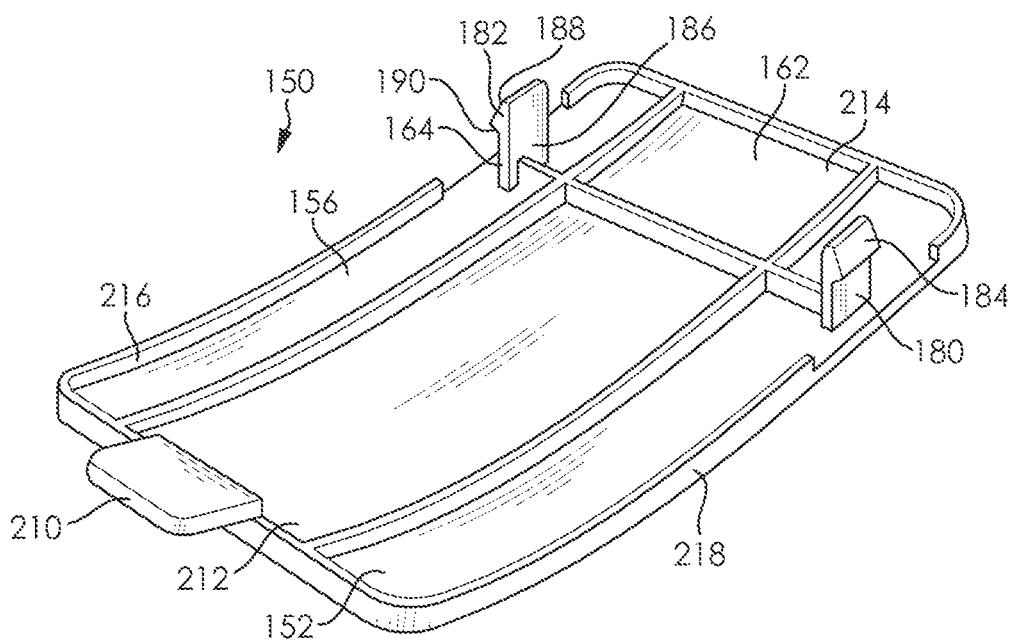
FIG. 5 is a bottom perspective view of the exemplary lid.
Figure 9:
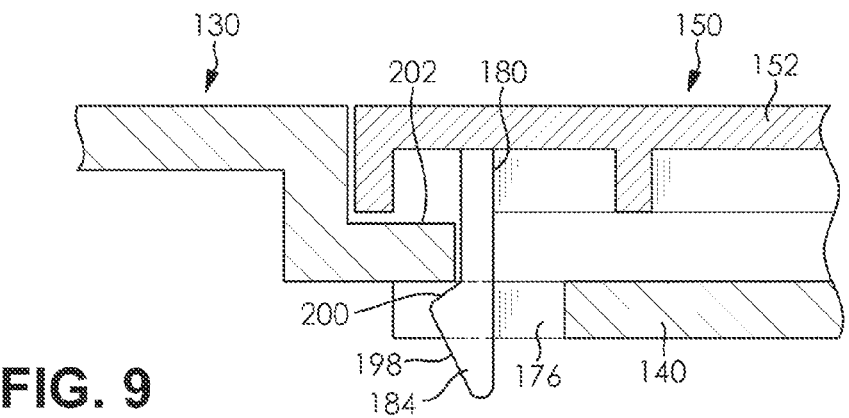
FIG. 9 is a cross-sectional view taken along line 9-9 of FIG. 6.

As shown in FIG. 5, each of the first and second engagement members 164, 180 projects outwardly from the interior surface 162 and includes a respective locking portion 182, 184 configured to engage the bottom wall 140 of the opening portion 138. According to one aspect, the first engagement member 164 includes a body 186 having one end attached to the interior surface 162. The locking portion 182 is provided at the other end of the body 186 and projects toward the edge portion 156. The locking portion 182 includes a first engaging surface 188 and a second engaging surface 190, each engaging surface 188, 190 being configured to at least partially displace the engagement member 164 as the lid 150 is being mounted to or removed from the body panel 130. By way of example, the first engaging surface 188 is canted away from the other end of the body 186 toward the edge portion 156, and the second engaging surface 190 is canted back toward the body 186. With this arrangement of the first and second engaging surfaces, the first engagement member 164 is in the form of a checked shaped or hooked tab. As the first engagement member 164 is being inserted into or removed from the engagement hole 160, a portion 194 of the bottom wall 140 defining the engagement hole 160 contacts the locking portion 182. This contact causes the first engagement member 164 to inwardly deflect and release from the bottom wall 140. In the depicted embodiment, the second engagement member 180 is shaped similar to the first engagement member 164 and the locking portion 184 is defined by first and second engaging surfaces 198, 200. As best depicted in FIG. 9, these engaging surface 198, 200 contact a portion 202 of the bottom wall 140 defining the engagement hole 176 and this, in turn, deflects the second engagement member 180 as the second engagement member 180 is being inserted into or removed from the engagement hole 176.

The lid body 152 further includes a retaining member 210 opposite the first and second engagement members 164, 180. According to one aspect, the retaining member 210 is in the form a tab located on one end portion 212 of the lid body 152 opposite the other end portion 214 having the first and second engagement members 164, 180 and is spaced inwardly from opposed sides 216, 218 of the lid body. As illustrated in FIG. 5, the retaining member 210 extends substantially perpendicularly from the end portion 212 and is oriented substantially perpendicular to the first and second engagement members 164, 180. To accommodate the retaining member 210 in the closed position of the lid 150, a retaining hole 220 is located in the opening portion 138. As shown, the retaining hole 220 is defined in the end portion 170 of the bottom wall 140 and a portion of the side wall 142 of the opening portion 138. This allows the retaining member 210 to move within the retaining hole 220 as the lid 150 is being moved from the closed position to the opened position. Further, as best depicted in FIG. 4, the bottom wall 140 of the opening portion 138 includes a first section 224 having the end portion 168 and a second section 226 having the other end portion 170. The second section 226 is angled inwardly relative to the first section 224, and the retaining hole 220 is located on the second section 226. By having the offset first and second sections 224, 226 of the bottom wall 140, to disengage the first and second engagement members 164, 180 from the bottom wall 140, the lid body 152 can be pivoted inwardly toward the second section 226 of the bottom wall 140. However, with the location of the retaining hole 220 in the opening portion 138, the retaining member 210 moves through the retaining hole 220 yet remains positioned in the retaining hole.

Figure 6:
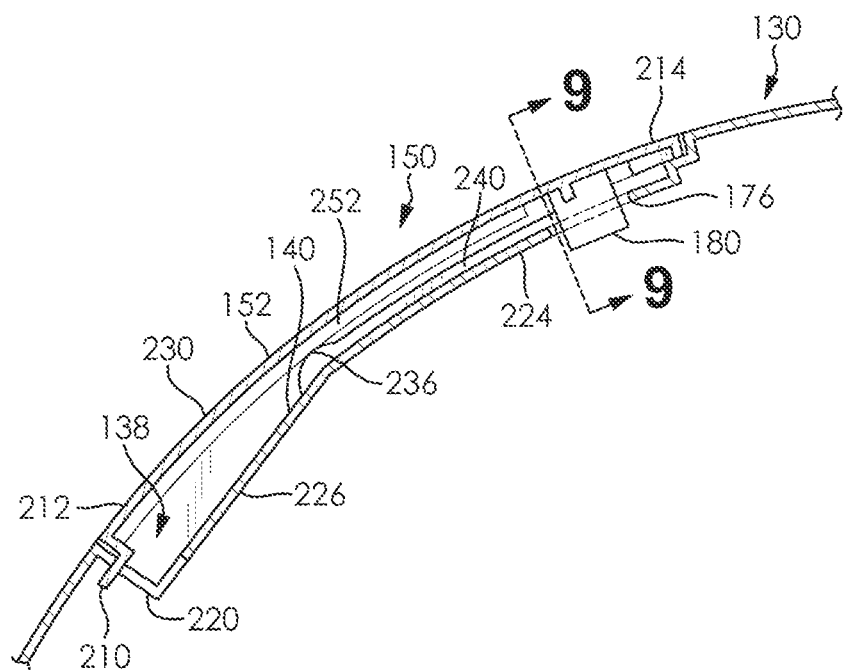
FIG. 6 is a cross-sectional view of the lid and body panel as shown in FIG. 2.
Figure 7:
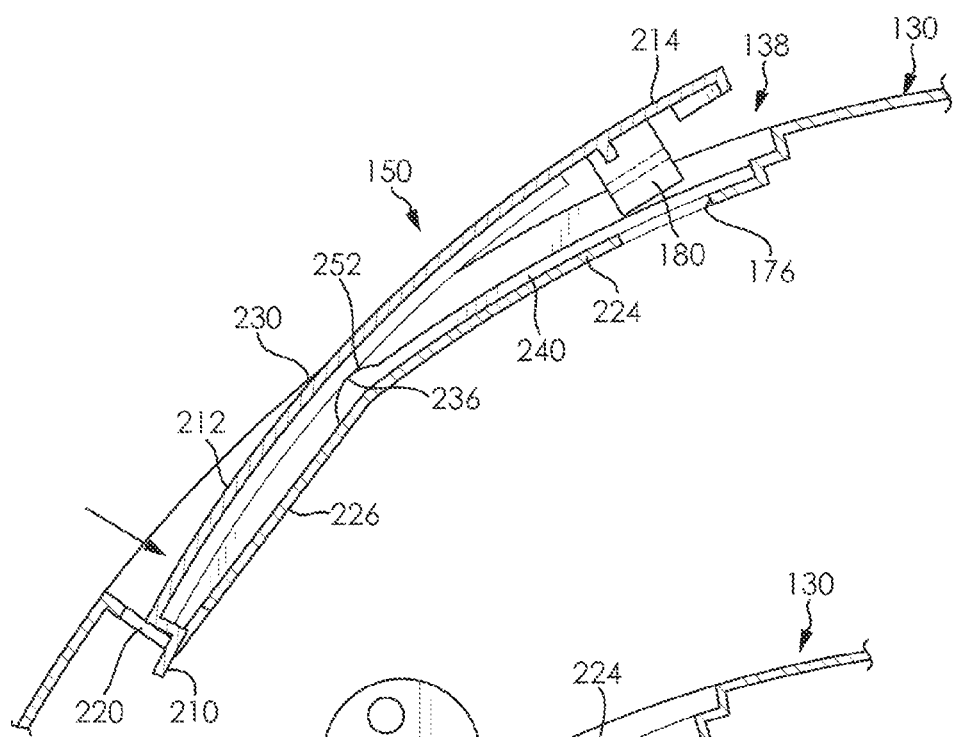
FIG. 7 is a cross-sectional view of the lid and body panel as shown in FIG. 3.
Figure 8:
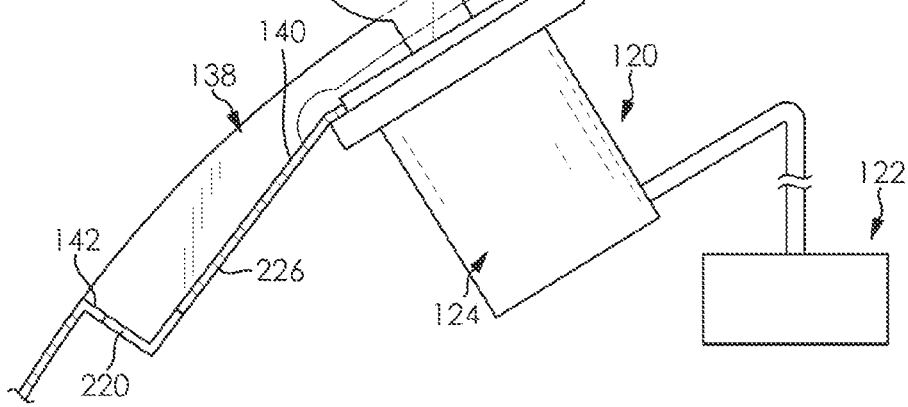
FIG. 8 is a cross-sectional view of the body panel as shown in FIG. 4 with the unlocking mechanism.

Particularly, and as best depicted in FIGS. 6 and 7, a portion 230 of the lid body 152 having the retaining member 210 is at least partially suspended over the second section 226 of the bottom wall 140 in the closed position of the lid 150. The first section 224 of the bottom wall 140 defines a pivot 236 by which the portion 230 of the lid body 152 is movable inwardly toward the second section 226 of the bottom wall 140. This pivoting movement of the lid portion 230 toward the second section 226 moves the end portion 214 of the lid body 152 having the first and second engagement members 164, 180 away from the first section 224 of the bottom wall 140. This, in turn, disengages the first and second engagement members from the bottom wall 140, the lid 150 now being removable from the opening portion 138 of the body panel 130 thereby providing access to the unlocking mechanism (FIG. 8). According to one aspect, the first section 224 of the bottom wall 140 of the opening portion 138 includes an elevated portion 240 that is elevated relative to the bottom wall 140 for contacting and supporting the interior surface 162 of the lid body 152, and an end 242 of the elevated portion 240 defines the pivot 236. In the illustrated embodiment of FIG. 4, the elevated portion 240 extends along each of the side portions 172, 174 and the end portion 168. The end 242 of the elevated portion 240 along the side portion 172 and an end 246 of the elevated portion along the side portion 174 include a respective curved portion 250, 252. The curved portions 250, 252 of the elevated portion 240 together define the pivot 236 allowing movement of the portion 230 of the lid body 152 having the retaining member 210 toward the second section 224 of the bottom wall 140 of the opening portion 138. Accordingly, to move the lid 150 from the closed position to the opened position the portion 230 of the lid body 152 is pivoted about the pivot 236 toward the second section 224 with the retaining member 210 remaining in the retaining hole 220, and movement of the portion 230 of the lid body 152 releases the each engagement member 164, 180 from the bottom wall 140 of the opening portion 138. The lid 150 can be placed back into the closed position by first positioning the retaining member 210 into the retaining hole 220 and then pivoting the lid 150 about the pivot 236 so that the first and second engagement members 164, 180 are received in the respective first and second engagement holes 160, 176 and engage the bottom wall 140.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly for housing an unlocking mechanism provided within a vehicle passenger compartment which is operably connected to a locking device of a trunk lid, the vehicle assembly comprising:
    an interior body panel having an outer surface including an opening portion for receiving an unlocking mechanism; and
    a lid removably mounted to the body panel and having a closed position for covering the opening portion and an opened position, the lid defining a lid body having an exterior surface, an edge portion of the exterior surface being continuous and without interruption about a periphery of the exterior surface so that the lid body exterior surface is flush with the body panel outer surface about the entire periphery of the lid body exterior surface,
    wherein the opening portion of the body panel includes a bottom wall having an engagement hole, and an interior surface of the lid body includes an engagement member which is received in the engagement hole, the engagement member securing the lid to the body panel,
    wherein the lid body further includes a retaining member opposite the engagement member, and the bottom wall of the opening portion includes a retaining hole for movably receiving the retaining member,
    wherein the bottom wall of the opening portion further includes a first section and a second section angled inwardly relative to the first section, the retaining hole being located on the second section.

2. The assembly of claim 1, wherein the bottom wall of the opening portion includes opposed end portions and opposed side portions elongated relative to the end portions, the engagement hole provided on one of the side portions adjacent one of the end portions.

3. The assembly of claim 1, wherein the engagement member includes a locking portion, the locking portion engaging the bottom wall of the opening portion.

4. The assembly of claim 3, wherein the engagement member is in the form of a hooked tab.

5. The assembly of claim 3, wherein the bottom wall of the opening portion includes a pair of engagement holes, and the lid body including a pair of corresponding similarly shaped engagement members.

6. The assembly of claim 1, wherein a portion of the lid body having the retaining member is at least partially suspended over the second section of the bottom wall in the closed position of the lid, wherein to move the lid from the closed position to the opened position the portion of the lid body is moved toward the second section with the retaining member remaining in the retaining hole and movement the portion of the lid body releases the engagement member from the bottom wall of the opening portion.

7. The assembly of claim 1, wherein the first section of the bottom wall of the opening portion defines a pivot about which the portion of the lid body is movable toward the second section of the bottom wall.

8. The assembly of claim 7, wherein the first section of the bottom wall of the opening portion includes an elevated portion for supporting the lid body, an end of the elevated portion defining the pivot.

9. The assembly of claim 1, wherein the retaining member is in the form a tab located on an end of the lid body and spaced inwardly from opposed sides of the lid body.

10. A vehicle assembly for housing an unlocking mechanism provided within a vehicle passenger compartment which is operably connected to a locking device of a trunk lid, the vehicle assembly comprising:
    an interior body panel having an outer surface including an opening portion for receiving an unlocking mechanism, the opening portion including a bottom wall offset from the outer surface, the bottom wall having an engagement hole; and
    a lid removably mounted to the body panel and having a closed position for covering the opening portion and an opened position, the lid defining a lid body having an exterior surface and an interior surface, an edge portion of the exterior surface extending about a periphery of the exterior surface being flush with the body panel outer surface, the lid body having an engagement member extending perpendicularly from the interior surface, the engagement member being received in the engagement hole and engaging the bottom wall,
    wherein the lid body includes a retaining member and the bottom wall of the opening portion includes a retaining hole for movably receiving the retaining member,
    wherein the bottom wall of the opening portion includes opposed end portions and opposed side portions elongated relative to the end portions, each of the side portions includes an elevated section that is elevated relative to the bottom wall for contacting the interior surface of the lid body, the elevated sections of the side portions defining a pivot allowing movement of a portion of the lid body having the retaining member toward the bottom wall of the opening portion.

11. The assembly of claim 10, wherein the bottom wall of the opening portion includes a pair of engagement holes, and the lid body including a pair of corresponding similarly shaped engagement members.

12. The assembly of claim 11, wherein the lid body includes opposed end portions and opposed side portions elongated relative to the end portions, the engagement members being located adjacent one of the end portions, the retaining member being adjacent the other of the end portions.

13. The assembly of claim 12, wherein the retaining member extends substantially perpendicularly from the other of the end portions and is spaced inwardly form each of the side portions.

14. The assembly of claim 10, wherein the bottom wall of the opening portion further includes a first section having one of the end portions and a second section having the other of the end portions, the second section being angled inwardly relative to the first section, the retaining hole being located on the second section, and the portion of the lid body having the retaining member is at least partially suspended over the second section of the bottom wall in the closed position of the lid.

15. A vehicle assembly comprising:
an unlocking mechanism operably connected to a locking device of a trunk lid and configured to actuate the locking device to unlock the trunk lid from within a vehicle passenger compartment;
an interior body panel having an outer surface including an opening portion for receiving the unlocking mechanism, the opening portion including a bottom wall offset from the outer surface, the bottom wall having a pair of spaced engagement holes and a retaining hole, wherein the bottom wall further includes a first section and a second section angled inwardly relative to the first section, the retaining hole being located on the second section; and
a lid removably mounted to the body panel and having a closed position for covering the opening portion and an opened position, the lid defining a lid body having an exterior surface flush with the body panel outer surface, the lid body having a pair of engagement members received in the engagement holes and engaging the bottom wall and a retaining member movably received in the retaining hole, wherein the lid is configured to pivot inwardly relative to the bottom wall toward the second section to move from the closed position to the opened position.

16. The assembly of claim 15,
wherein a portion of the lid body having the retaining member is at least partially suspended over the second section of the bottom wall in the closed position of the lid, wherein pivoting movement of the lid moves the lid body with the retaining member remaining in the retaining hole, and the pivoting movement of the lid releases the engagement member from the bottom wall of the opening portion.

* * * * *